(12) United States Patent
Nakayama et al.

(10) Patent No.: US 11,104,812 B2
(45) Date of Patent: Aug. 31, 2021

(54) SILICONE COMPOSITION, RELEASE PAPER, AND RELEASE FILM

(71) Applicant: SHIN-ETSU CHEMICAL CO., LTD., Tokyo (JP)

(72) Inventors: Ken Nakayama, Annaka (JP); Ataru Kobayashi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 104 days.

(21) Appl. No.: 16/480,533

(22) PCT Filed: Jan. 16, 2018

(86) PCT No.: PCT/JP2018/001028
§ 371 (c)(1),
(2) Date: Jul. 24, 2019

(87) PCT Pub. No.: WO2018/139269
PCT Pub. Date: Aug. 2, 2018

(65) Prior Publication Data
US 2019/0382596 A1    Dec. 19, 2019

(30) Foreign Application Priority Data
Jan. 25, 2017    (JP) .............................. JP2017-011361

(51) Int. Cl.
| | |
|---|---|
| C09D 5/20 | (2006.01) |
| C09D 183/04 | (2006.01) |
| C09J 7/40 | (2018.01) |
| D21H 19/32 | (2006.01) |
| D21H 27/00 | (2006.01) |
| B32B 7/06 | (2019.01) |
| B32B 27/08 | (2006.01) |
| B32B 7/12 | (2006.01) |
| B32B 27/36 | (2006.01) |

(52) U.S. Cl.
CPC .................. *C09D 5/20* (2013.01); *B32B 7/06* (2013.01); *B32B 7/12* (2013.01); *B32B 27/08* (2013.01); *B32B 27/36* (2013.01); *C09D 183/04* (2013.01); *C09J 7/401* (2018.01); *D21H 19/32* (2013.01); *D21H 27/00* (2013.01); *B32B 2405/00* (2013.01); *C08L 2205/025* (2013.01); *C08L 2205/03* (2013.01); *C09J 2483/005* (2013.01)

(58) Field of Classification Search
None
See application file for complete search history.

(56) References Cited

U.S. PATENT DOCUMENTS

| | | | |
|---|---|---|---|
| 8,937,123 B2 * | 1/2015 | Kato | ...................... C09J 183/04 524/106 |
| 2010/0255205 A1 | 10/2010 | Cray et al. | |
| 2011/0251311 A1 * | 10/2011 | Kato | ...................... C08G 77/38 524/114 |
| 2011/0274935 A1 | 11/2011 | Yamamoto et al. | |
| 2018/0155877 A1 | 6/2018 | Yamamoto et al. | |

FOREIGN PATENT DOCUMENTS

| | | |
|---|---|---|
| EP | 2 112 191 A1 | 10/2009 |
| JP | S47 032072 A | 11/1972 |
| JP | H06220327 A | 8/1994 |
| JP | 2009 263467 A1 | 11/2009 |
| JP | 2010 500462 A | 1/2010 |
| JP | 2010 180347 A | 8/2010 |
| JP | 2011 132532 A | 7/2011 |
| JP | 2011 252142 A | 12/2011 |
| TW | 2017 15009 A | 5/2017 |
| WO | WO 2008/019953 A1 | 2/2008 |
| WO | WO 2016/199561 A1 | 12/2016 |

OTHER PUBLICATIONS

International Search Report and Written Opinion for Application No. PCT/JP2018/001028 dated Mar. 13, 2018, 18 pages.

* cited by examiner

*Primary Examiner* — Dennis R Cordray
(74) *Attorney, Agent, or Firm* — Rimon, P.C.

(57) ABSTRACT

Provided is a solventless silicone composition which can form a highly transparent release coating having excellent adhesion to a substrate, in particular to a plastic film substrate, and which can provide a layer of cured product having good adhesion even when the release coating exhibits a small peeling force. Also provided is a release paper and release film having such a cured coating.

11 Claims, No Drawings

SILICONE COMPOSITION, RELEASE PAPER, AND RELEASE FILM

CROSS-REFERENCE TO RELATED APPLICATIONS

The present application is a national phase entry of International Application No. PCT/JP2018/001028, filed Jan. 16, 2018, which claims priority to Japanese Application No. 2017-011361, filed Jan. 25, 2017, the contents of which are incorporated herein by reference in their entirety.

TECHNICAL FIELD

The present invention relates to a silicone composition, in particular of a solvent-free type, which provides a cured layer having improved adhesion to a substrate, in particular a plastic film substrate such as a polyester film. It also relates to release paper or a release film having a coating of the cured composition.

BACKGROUND ART

Conventionally, a coating of a cured product of a silicone composition is formed on a surface of a sheet-like substrate such as paper or a plastic sheet, in order to impart, to the substrate, releasability from an adhesive material (e.g., a property of being cleanly peeled off from an adhesive material). A method for forming a coating of a cured silicone composition on a substrate surface is described in, for example, JP S47(1972)-032072-A (Patent Literature 1), in which a releasable coating is formed on the substrate surface by the addition reaction between an organopolysiloxane having alkenyl groups and an organohydrogenpolysiloxane in the presence of a platinum-based catalyst.

Silicone compositions curable by the addition reaction to form a coating may be categorized into three types: a solvent-type in which the silicone composition is dissolved in an organic solvent; an emulsion-type in which the silicone composition is dispersed in water using an emulsifier; and a solvent-free type. The solvent-type composition has a disadvantage that it is harmful to the human body and the environment. The emulsion-type composition has problems that it requires a high energy input for water removal, and that the emulsifier remains in a coating after curing, resulting in a coating with reduced adhesion to the substrate. Therefore, a solvent-free type silicone composition is desirable.

However, conventional solvent-free-type silicone compositions have a problem that they show poor adhesion to plastic films such as polyester films and polypropylene films, although they show good adhesion to paper substrates.

The adhesion of a solvent-free-type silicone composition to a film substrate may be improved by, for example, adding a silane coupling agent to a silicone composition, or subjecting the surface of a substrate to an adhesion-enhancing treatment or a primer treatment prior to application of the composition. However, solvent-free-type silicone compositions containing a silane coupling agent are still unsatisfactory in adhesion to the substrate. On the other hand, the surface treatment of a substrate has a disadvantage that an additional process step is required.

JP 2011-252142-A (Patent Literature 2) describes a method where a low-molecular weight siloxane having an alkenyl group is added to the composition and the resulting composition is irradiated by ultraviolet and heated to cure, whereby improving the adhesion to a substrate without affecting the release properties. However, this method requires a UV irradiation apparatus along with a dryer for heating.

JP H06-220327-A (Patent Literature 3) discloses a solvent-free-type silicone composition comprising a base polymer having a branched structure with $RSiO_{3/2}$ units, and describes that the silicone composition shows improved adhesion between the resulting cured coating and a substrate. The adhesion to an OPP (oriented polypropylene) film is improved, but the adhesion to a polyester-based film substrate is still unsatisfactory.

JP 2011-132532-A (Patent Literature 4) describes a method for enhancing adhesion of a silicone composition to a substrate, using a small amount of an additive, in particular an organopolysiloxane having an epoxy group. However, this document describes only solvent-type silicone compositions in the Examples, and is silent on adhesion properties obtained by the addition of the organopolysiloxane having an epoxy group and on transparency of the cured coating.

JP 2010-500462-A (Patent Literature 5) describes that the addition of a reaction product of a fluid polyorganosiloxane having alkenyl group(s) and silanol group(s) with a hydrolysable silane having epoxide group(s), as an anchorage additive, to a solvent-free-type silicone composition attains a cured coating having improved adhesion to a substrate. This document describes that a release coating composition based on a siloxane having a plurality of branches and comprising one or more Q units ($SiO_{4/2}$), D units ($R^b_2 SiO_{2/2}$) and a plurality of M units ($R^a R^b_2 SiO_{1/2}$), and the anchorage additive gives good anchorage. It describes in the Examples compositions comprising a combination of the specific organopolysiloxane having Q units ($SiO_{4/2}$) and alkenyl groups with the anchorage additive. However, this document is silent on release properties of the release coating composition and on transparency of the cured coating.

Recently, there is a growing demand for a release film which retain good adhesion to a substrate during its shaping step, along with a smaller peeling force than those conventional products. However, the prior art release film compositions having a smaller peeling force tend to exhibit poorer adhesion to a substrate, and require, for improving the adhesion, the addition of a functional compound which interacts with the substrate, as described in JP 2011-132532-A and JP 2010-500462-A (Patent Literatures 4 and 5). However, such a functional compound has low compatibility with the siloxane composition. Accordingly, the compound has problems of lower transparency and heavy peeling on the cured coating. Thus, a solvent-free-type release silicone composition has not yet been seen, which almost satisfies the demand.

SUMMARY

The present invention has been made in these circumstances, and aims to provide a silicone composition which forms a highly transparent release coating having excellent adhesion to a substrate, in particular to a plastic film substrate, such as a polyester film, and which provides a layer of a cured product having good adhesion even when the release coating exhibits a small peeling force. It also aims to provide a release paper and release film having such a cured coating.

As a result of intensive researches to attain the object described above, the present inventors have discovered that the object is attained by admixing a conventional release silicone composition free of an aryl group with a specific amount of an organohydrogenpolysiloxane having at least three hydrogen atoms each bonded to a silicon atom in a molecule, and having an aryl group such that a percentage (%) of the total number of the aryl groups relative to a total number of hydrogen atoms and groups each bonded to a silicon atom (hereinafter referred to as "percentage of aryl groups") is 8% to 50%, and have completed the present invention. As used herein, the term "aryl group" means at least one of an aryl group bonded to a silicon atom and an aryl group present in an aralkyl group bonded to a silicon atom. Examples of the aryl group present in an aralkyl group include a phenyl group present in benzyl (i.e., phenylmethyl) or phenethyl (i.e., phenylethyl) groups.

Thus, the present invention provides a silicone composition comprising:

(A) an organopolysiloxane having at least two alkenyl groups each bonded to a silicon atom in a molecule, and having no aryl group, wherein a percentage of the number of the alkenyl groups relative to the number of groups each bonded to a silicon atom is from 0.01% to less than 4.5%;

(B) an organohydrogenpolysiloxane having at least three hydrogen atoms each bonded to a silicon atom in a molecule, and having no aryl group, wherein a ratio of the number of the SiH groups in component (B) to the number of the alkenyl groups in component (A) is 0.5 to 10;

(C) a catalytic amount of a catalyst based on a platinum group metal; and (D) an organohydrogenpolysiloxane having at least three hydrogen atoms each bonded to a silicon atom in a molecule, and having an aryl group or aryl groups such that a percentage of the number of the aryl groups relative to a total number of hydrogen atoms and groups each bonded to a silicon atom is 8% to 50%, the amount of the organohydrogenpolysiloxane (D) being from 0.01 to 10 parts by mass, relative to 100 parts by mass of a total of components (A) and (B), wherein a ratio of the number of the SiH groups in component (D) to the number of the alkenyl groups in component (A) is 0.1 to 2.0.

The present invention also provides release paper or a release film comprising a layer of a cured product of the silicone composition.

The silicone composition according to the present invention provides a highly transparent cured coating having excellent adhesion to a substrate, in particular to a plastic film substrate. It also provides a layer of a cured product having good adhesion even when the release coating exhibits a small peeling force. That is, it provides a cured coating with excellent non-tackiness.

DETAILED DESCRIPTION

The present invention will be described in more detail.

[(A) Alkenyl Group-Containing Organopolysiloxane having no Aryl Group]

Component (A) is an organopolysiloxane having at least two alkenyl groups per molecule and having no aryl group such that the percentage of the number of the alkenyl groups relative to the number of groups each bonded to a silicon atom is from 0.01% to less than 4.5%. The organopolysiloxane may be any alkenyl group-containing organopolysiloxane conventionally used in addition-curable silicone compositions known in the art Component (A) organopolysiloxane has at least two alkenyl groups. If it has less than two alkenyl groups, it is quite likely that uncrosslinked molecules remain after curing of the composition, resulting in undesirably low curability. Preferably, the percentage of the number of the alkenyl groups relative to the number of groups each bonded to a silicon atom is from 0.01% to less than 4.5%, and more preferably from 0.02% to less than 4.0%. If the percentage of the alkenyl groups is less than the lower limit indicated above, the curability may be worse. If the percentage of the alkenyl groups exceeds the upper limit indicated above, the resulting cured coating may be of heavy peeling (i.e., requiring a larger force to peel an adhesive material from the cured coating). That is, after the adhesive material is applied on the release layer of the cured coating and is then peeled off therefrom, the adhesion strength of the adhesive material (hereinafter referred to as "remaining adhesion") is made lower. Examples of the group bonded to a silicon atom include hydroxy, alkyl, aryl and aralkyl groups, and alkyl groups substituted with, e.g., halogen atom(s), and more specifically, groups represented by $R^3$ described below.

Preferably, component (A) has a viscosity at 25° C. in the rage of from 50 mPa·s to 10,000 mPa·s, in particular from 50 mPa·s to 5,000 mPa·s. If necessary, an organopolysiloxane having a viscosity of from 10,000 mPa·s to, in a 30% solution in toluene, 50,000 mPa·s may be additionally used. In a case where two or more of the organopolysiloxanes are used in combination, it is preferable that component (A) as a whole has a viscosity of at most 10,000 mPa·s. If the viscosity exceeds this limit, the coatability of the composition may undesirably deteriorate. It should be noted that the viscosity herein may be determined with a rotational viscometer (hereinafter the same).

Component (A) is preferably represented by the general formula (3) shown below. The organopolysiloxane may be used alone, or in combination of two or more of them. It should be noted that the sequence of the siloxane units shown in the parentheses is for an illustrative purpose only, and is not limited thereto or thereby.

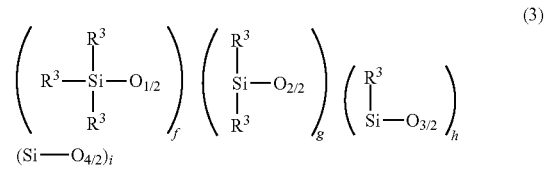

$$\left(R^3-\underset{R^3}{\overset{R^3}{\underset{|}{Si}}}-O_{1/2}\right)_f \left(\underset{R^3}{\overset{R^3}{\underset{|}{Si}}}-O_{2/2}\right)_g \left(\underset{}{\overset{R^3}{\underset{|}{Si}}}-O_{3/2}\right)_h \quad (3)$$
$$(Si-O_{4/2})_i$$

In the formula (3) above, $R^3$ is, independently at each occurrence, a hydroxy group, a substituted or unsubstituted monovalent hydrocarbon group having no aliphatic unsaturated bond, or a monovalent hydrocarbon group having an alkenyl group(s) and 2 to 12 carbon atoms and optionally containing an oxygen atom(s). The organopolysiloxane has at least two alkenyl groups per molecule.

Preferably, the monovalent hydrocarbon group having no aliphatic unsaturated bond has 1 to 10 carbon atoms. Examples thereof include alkyl groups, preferably, of 1 to 6 carbon atoms, such as methyl, ethyl, propyl and butyl groups; cycloalkyl groups, preferably, of 5 to 8 carbon atoms, such as a cyclohexyl group; and derivatives thereof in which a part or all of the hydrogen atoms each bonded to a carbon atom of the aforementioned groups are substituted with a substituent, such as a hydroxy or cyano group, a halogen atom, or an alkoxysilyl, polyoxyalkylene, epoxy or carboxyl group. In view of the releasability, alkyl groups are especially preferred, particularly methyl, ethyl and propyl groups.

Examples of the alkenyl group include alkenyl groups, such as vinyl, allyl, hexenyl and octenyl groups; and cycloalkenylalkyl groups, such as a cyclohexenylethyl group. Examples of the monovalent hydrocarbon group containing alkenyl group(s) and optionally oxygen atom(s) include acryloylalkyl and methacryloylalkyl groups, such as acryloylpropyl, acryloylmethyl and methacryloylpropyl groups. The group may optionally have an ether bond in a methylene chain, e.g., $-(CH_2)_2-O-CH_2-CH=CH_2$ and $-(CH_2)_3-O-CH_2-CH=CH_2$. Among these, a vinyl group is preferred in an industrial point of view.

In the formula (3) above, f is an integer of at least 2, preferably from 2 to 300, g is an integer of at least 1, preferably from 30 to 20,000, h is an integer of at least 0, preferably from 0 to 100, i is an integer of at least 0, preferably from 0 to 100, and preferably $30 \leq f+g+h+i \leq 20,000$, more preferably $50 \leq f+g+h+i \leq 15,000$. If the value of f+g+h+i is less than the lower limit indicated above, the resulting composition may show poor coatability. If the value exceeds the upper limit indicated above, high-speed coating of the composition on a substrate surface may cause misting at a coating roll of a coating apparatus.

Examples of the organopolysiloxane (A) include, but not limited to, those shown below. In the formulas shown below, Me and Vi stand for a methyl group and a vinyl group, respectively. It should be also noted that the sequence of the siloxane units in parentheses is for an illustrative purpose only, and is not limited thereto or thereby.

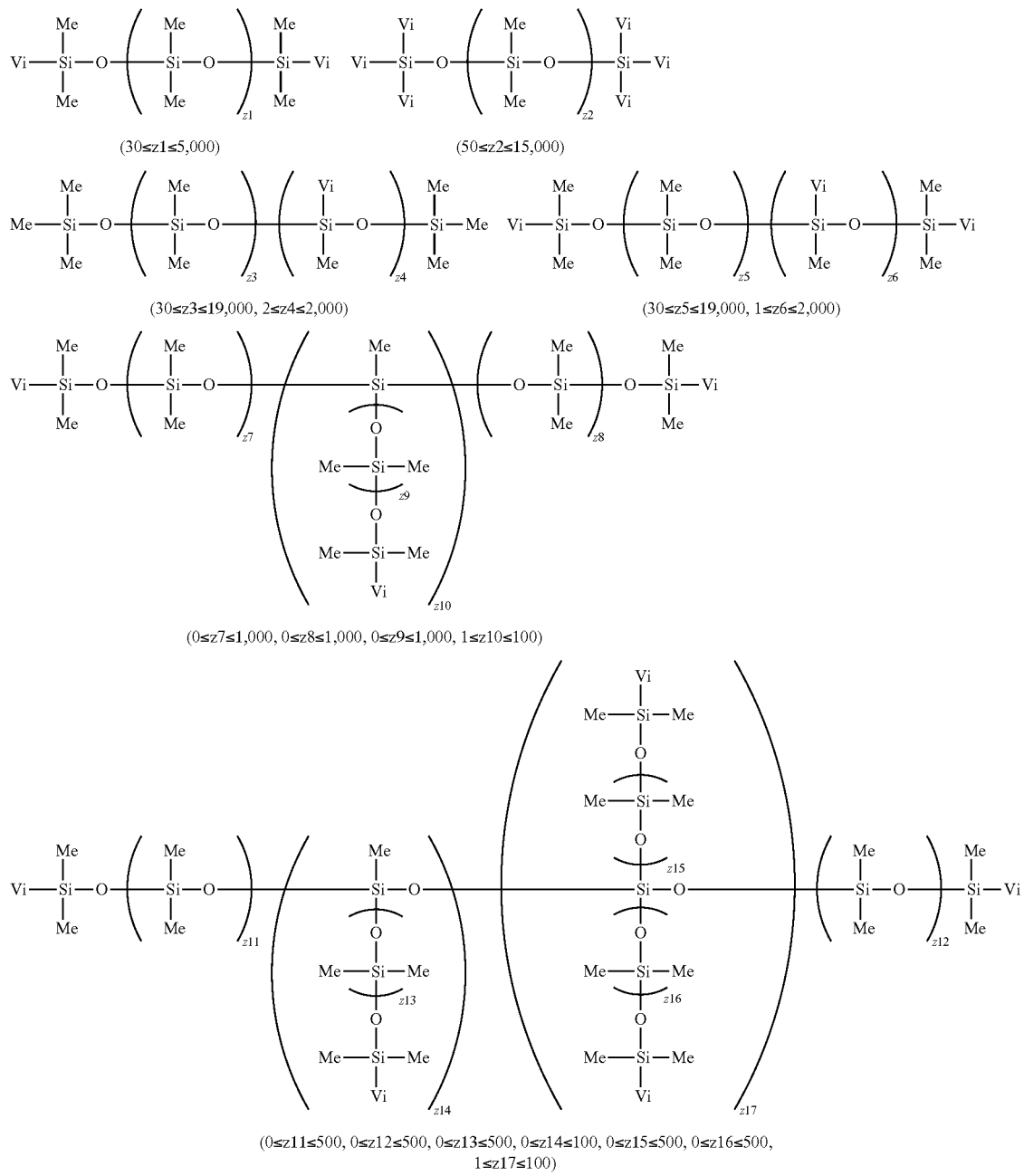

[(B) Organohydrogenpolysiloxane having no aryl group]

Component (B) is an organohydrogenpolysiloxane having at least three hydrogen atoms each bonded to a silicon atom in a molecule, and having no aryl group. The organohydrogenpolysiloxane may be used alone, or in combination of two or more of them.

Curing occurs through the addition reaction between the SiH groups in the organohydrogenpolysiloxane (B) and the alkenyl groups in component (A), resulting in the formation of a coating. The amount of component (B) is such that the ratio of the number of the SiH groups in component (B) to the number of the alkenyl groups in component (A) is 0.5 to 10, preferably 1 to 8, and more preferably 1.5 to 6. If the ratio is less than the lower limit indicated above, the resulting cured coating may have low adhesion to the substrate. If the ratio exceeds the upper limit indicated above, the resulting cured coating may be heavy peeling (i.e., requiring a larger force to peel an adhesive material from the cured coating). That is, after the adhesive material is applied on the release layer of the cured coating and is then peeled off therefrom, the adhesion strength of the adhesive material is made lower.

The organohydrogenpolysiloxane (B) may be represented by, e.g., the following average compositional formula (4):

$$R^4_j H_k SiO_{(4-j-k)/2} \quad (4)$$

wherein $R^4$ is, independently at each occurrence, a hydroxy group or a substituted or unsubstituted monovalent hydrocarbon group having no aliphatic unsaturated bond, provided that $R^4$ is neither an aryl nor an aralkyl group; and j and k are the real number greater than 0, provided that $j+k \leq 3$.

Examples of the monovalent hydrocarbon group include alkyl groups, preferably, of 1 to 6 carbon atoms, such as methyl, ethyl, propyl and butyl groups; cycloalkyl groups, preferably, of 5 to 8 carbon atoms, such as cyclohexyl group; and monovalent hydrocarbon groups having 1 to 10 carbon atoms in which a part or all of the hydrogen atoms each bonded to a carbon atom of the aforementioned groups are substituted with a substituent, such as a hydroxy or cyano group, a halogen atom, or an alkoxysilyl, polyoxyalkylene, epoxy or carboxyl group. Among these, $R^1$ is preferably an alkyl group, more preferably methyl, ethyl or propyl groups in view of enhancing the rate of the addition reaction.

In the formula (4) above, j is the number of j>0, preferably from 0.1 to 2.0, k is the number of k>0, preferably from 0.1 to 3, and j and k satisfy $0<j+k \leq 3$, in particular $0.5<j+k \leq 2.9$.

The organohydrogenpolysiloxane (B) may be any of straight chain, branched chain or cyclic, or a mixture thereof. Examples of the organohydrogenpolysiloxane include polymers or copolymers comprising at least one of $R^4 HSiO_{2/2}$, $HSiO_{3/2}$ and $R^4_2 HSiO_{1/2}$ units and, optionally, one or more of $R^4_2 SiO_{2/2}$, $R^4 SiO_{3/2}$ and $R^4_3 SiO_{1/2}$ units, wherein $R^4$ is as defined above. It preferably comprises at least three, more preferably 5 to 300, $R^4 HSiO_{2/2}$ and $R^4_2 HSiO_{1/2}$ to units in total per molecule. It may further comprise $SiO_{4/2}$ units in such an amount that the benefits of the invention are not impaired.

The organohydrogenpolysiloxane comprise 3 to 300, more preferably 5 to 200, SiH groups per molecule. If the number of the SiH group is less than 3 or exceeds 300, the curability or adhesion may be worse.

Preferably, component (B) has a viscosity at 25° C. of from 0.001 to 10 Pa·s, in particular from 0.005 to 5 Pa·s. If the viscosity is too low, the curability may be worse. If it is too high, the workability may decline.

Examples of component (B) include, but not limited to, the compounds shown below. In the formulas shown below, Me stands for a methyl group. It should be noted that the sequence of the siloxane units shown in the parentheses is for an illustrative purpose only, and is not limited thereto or thereby.

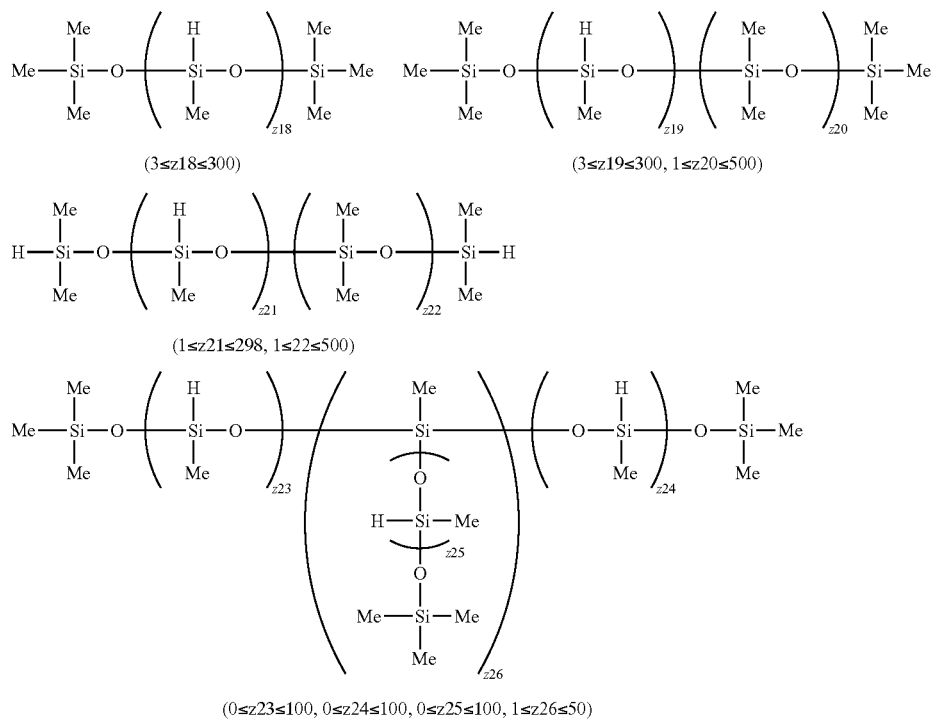

-continued

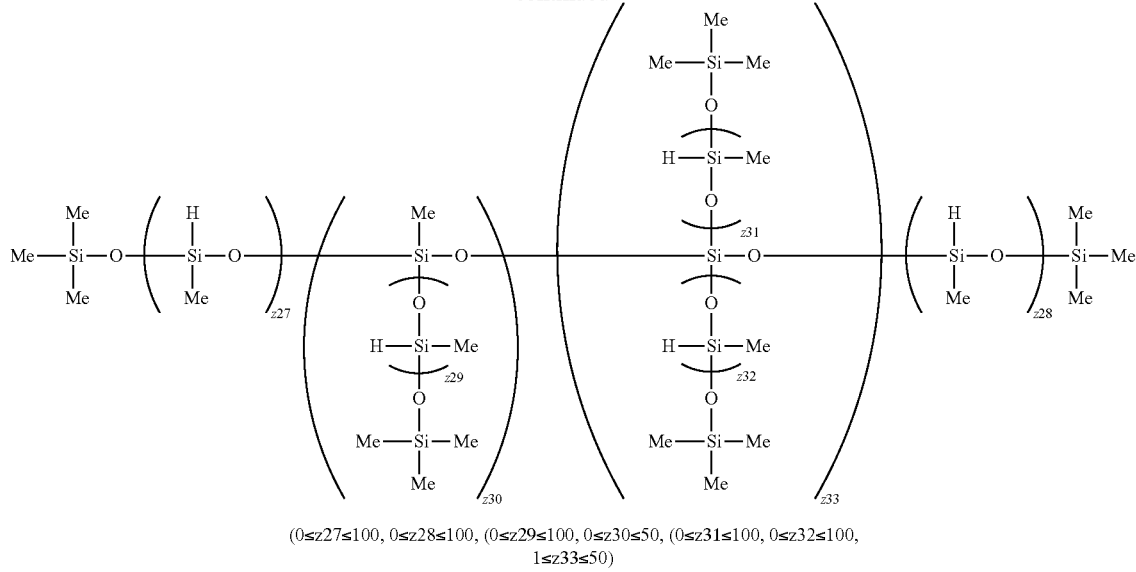

$(0 \leq z27 \leq 100, 0 \leq z28 \leq 100, (0 \leq z29 \leq 100, 0 \leq z30 \leq 50, (0 \leq z31 \leq 100, 0 \leq z32 \leq 100, 1 \leq z33 \leq 50)$

[(C) Catalyst Based on a Platinum Group Metal]

Component (C) is a catalyst for promoting the addition reaction of component (A) and optionally component (E) described below with component (B) and component (D) described below. The catalyst may be such known in the art that promotes the so-called hydrosilylation. Examples of the catalyst based on a platinum group metal include platinum-based catalysts, palladium-based catalysts, rhodium-based catalysts and ruthenium-based catalysts. Among these, platinum-based catalysts are preferably used. Examples of the platinum-based catalyst include chloroplatinic acid, an alcohol or aldehyde solution of chloroplatinic acid, and complexes of chloroplatinic acid or platinum with a variety of olefins or vinylsiloxane Component (C) may be used in a catalytic amount. As used herein, the term "catalytic amount" is intended to mean an effective amount for promoting the addition reaction of component (A) and optionally component (E) described below with component (B) and component (D) described below. To obtain a good cured coating, it preferably ranges from 1 to 5,000 ppm by mass, in particular from 10 to 1,000 ppm by mass, of a platinum group metal, based on the combined mass of components (A) and (B).

[(D) Organohydrogenpolysiloxane having Aryl Groups]

Component (D) is an organohydrogenpolysiloxane having at least three hydrogen atoms each bonded to a silicon atom in a molecule, and having an aryl group such that the percentage of the number of the aryl groups relative to the total number of the hydrogen atoms and groups each bonded to a silicon atom is 8% to 50%. As described before, the aryl group is at least one of an aryl group bonded to a silicon atom and an aryl group present in an aralkyl group bonded to a silicon atom. The organohydrogenpolysiloxane may be used alone, or in combination of two or more thereof.

The amount of component (D) is from 0.01 to 10 parts by mass, preferably from 0.1 to 9 parts by mass, and more preferably from 0.5 to 8 parts by mass, relative to total 100 parts by mass of components (A) and (B), and is such that the ratio of the number of the SiH groups in component (D) to the number of the alkenyl groups in component (A) is between 0.1 and 2.0, preferably from 0.1 to less than 1.5, more preferably from 0.1 to 1.2, still more preferably from 0.2 to 1.0. If the amount is less than the lower limit, the resulting cured coating may show low adhesion to a substrate. If the amount exceeds the upper limit, the resulting cured coating may be less transparent or may be heavy peeling. It is also preferable that the amount of component (B) is at least 20 parts by mass, preferably from 30 to 90 parts by mass, and more preferably from 35 to 85 parts by mass, per total 100 parts by mass of components (B) and (D).

Component (D) has an aryl group in such that the percentage (%) of the number of the aryl groups relative to the total number of the hydrogen atoms and groups each bonded to a silicon atom is 8% to 50%. The percentage is preferably from 9 to 45%, and still more preferably from 10 to 40%. By the use of component (D) having an aryl group in the above-mentioned range, the resulting cured coating show improved adhesion to a substrate. It is believed that component (D) has low compatibility with components (A) and (B) both having no aryl group, and is localized near a substrate with the crosslinking reaction proceeding. Then, the SiH groups in component (D) interact with functional groups present on the substrate surface. Particularly, in a case where the substrate is a plastic film, n-electrons of the aryl groups in component (D) interact with n-electrons in the aromatic ring of the plastic, thereby improving the adhesion by the stacking effect.

If the percentage of the aryl groups is less than the lower limit indicated above, the resulting cured coating may not show good adhesion to a substrate. If the percentage exceeds the upper limit indicated above, the cured coating may exhibit reduced transparency. As described above, the number of the aryl groups includes the number of the aryl groups present in the aralkyl groups. Examples of the group bonded to a silicon atom include hydroxy, alkyl, aryl and aralkyl groups, and alkyl groups substituted with, e.g., halogen atom(s), and more specifically, groups represented by $R^1$ described below.

Preferably, component (D) has an average polymerization degree of from 5 to 500, more preferably from 7 to 450, and still more preferably from 10 to 400. If the average polymerization degree exceeds the upper limit indicated above, the resulting cured coating may show poor adhesion to a substrate or may be less transparent.

The organohydrogenpolysiloxane (D) may be represented by, e.g., the following average compositional formula (1):

wherein $R^1$ is, independently at each occurrence, a hydroxy group or a substituted or unsubstituted monovalent hydrocarbon group having no aliphatic unsaturated bond, wherein from 8% to 50%, in number, of $R^1$, relative to the total number of $R^1$ and the hydrogen atoms each bonded to a silicon atom, is an aryl group, a and b are the number greater than 0, with a+b≤3.

Examples of the monovalent hydrocarbon group include alkyl groups, preferably, of 1 to 6 carbon atoms, such as methyl, ethyl, propyl and butyl groups; cycloalkyl groups, preferably, of 5 to 8 carbon atoms, such as cyclohexyl group; aryl groups, preferably, of 6 to 10 carbon atoms, such as phenyl and tolyl groups; aralkyl groups, preferably of 7 to 10 carbon atoms, such as a benzyl group; and monovalent hydrocarbon groups having 1 to 10 carbon atoms in which a part or all of hydrogen atoms each bonded to a carbon atom of the aforementioned groups are substituted with a substituent, such as a hydroxy or cyano group, a halogen atom, or an alkoxysilyl, polyoxyalkylene, epoxy or carboxyl group. At least one $R^1$ is an aryl or aralkyl group, preferably an aryl group. Among these, $R^1$ is preferably an alkyl or aryl group, and more preferably a methyl, ethyl, propyl or phenyl group.

Preferably, a is the number of from 0.1 to 2.0, b is the number of from 0.1 to 3.0, and more specifically a and b satisfy 0.5<a+b≤2.9.

Examples of the organohydrogenpolysiloxane of formula (1) above include polymers or copolymers comprising at least one of $R^1HSiO_{2/2}$, $HSiO_{3/2}$ and $R^1{}_2HSiO_{1/2}$ units and, optionally, one or more of $R^1{}_2SiO_{2/2}$, $R^1SiO_{3/2}$ and $R^1{}_3SiO_{1/2}$ units, wherein $R^1$ is as defined above. It preferably comprises at least three, more preferably at least five, $R^1HSiO_{2/2}$ and $R^1{}_2HSiO_{1/2}$ units in total per molecule. It may further comprise $SiO_{4/2}$ units in such an amount that the benefits of the invention are not impaired.

The organohydrogenpolysiloxane comprise 3 to 400, more preferably 5 to 300, SiH groups per molecule. If the number of the SiH groups is less than 3 or exceeds 400, the curability or adhesion may be worse.

The organohydrogenpolysiloxane (D) may be any of straight chain, branched chain or cyclic, or a mixture thereof. The organohydrogenpolysiloxane is preferably represented by the formula (2) shown below.

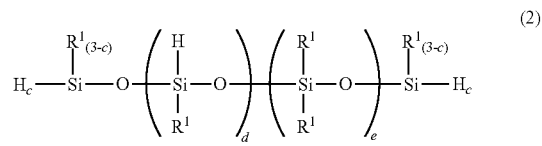

wherein $R^1$ is as defined above, c is 0 or 1, d and e are an integer satisfying 1≤d≤400 and 0≤e≤400, provided that 3≤2c+d≤400 and 5≤d+e≤498. The sequence of the siloxane units in parentheses is for an illustrative purpose only, and is not limited thereto or thereby.

Preferably, d is an integer of from 3 to 300, e is an integer of from 3 to 300, and c, d and e satisfy 5≤2c+d≤300 and 7≤d+e≤450.

Preferably, component (D) has a viscosity at 25° C. of from 0.001 to 3 Pa·s, in particular from 0.005 to 1 Pa·s. If the viscosity is too low, good adhesion to the substrate may not be attained. If it is too high, the cured coating may exhibit reduced transparency.

Examples of component (D) include, but not limited to, those shown below. In the formulas shown below, Me and Ph stand for a methyl group and a phenyl group, respectively. It should be noted that the sequence of the siloxane units in parentheses is for an illustrative purpose only, and is not limited thereto or thereby. In each formula shown below, the numbers of siloxane repeating units are average values.

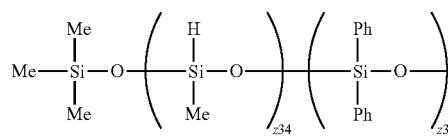

(3≤z34≤400, 1≤z35≤250, 5≤z34+z35≤498)

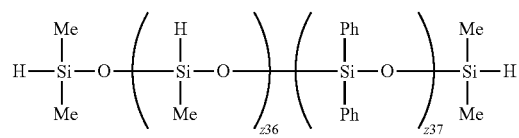

(1≤z36≤398, 1≤z37≤250, 5≤z36+z37≤498)

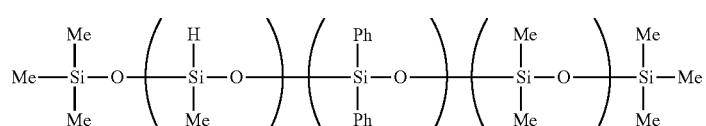

(3≤z38≤400, 1≤z39≤250, 1≤z40≤200, 5≤z38+z39+z40≤498)

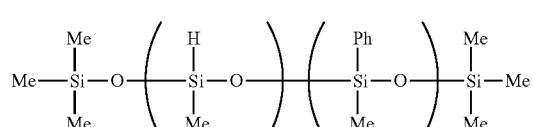

(3≤z41≤400, 2≤z42≤400, 5≤z41+z42≤498)

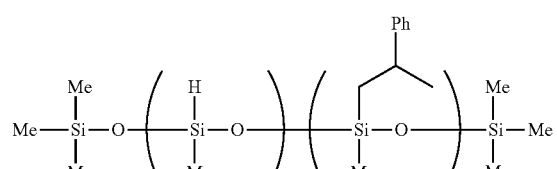

(3≤z43≤400, 2≤z44≤400, 5≤z43+z44≤498)

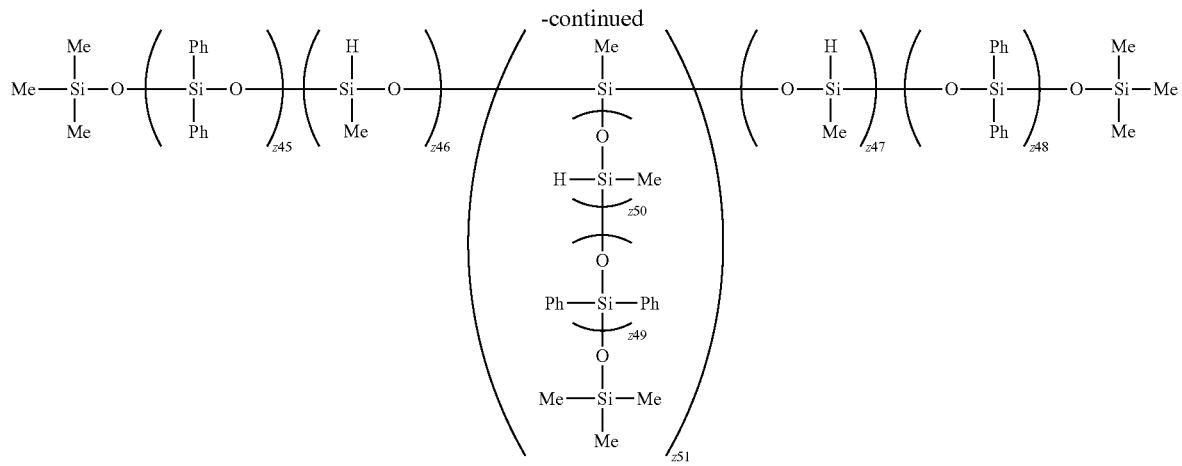

($0 \leq z45 \leq 100$, $0 \leq z46 \leq 100$, $0 \leq z47 \leq 100$, $0 \leq z48 \leq 100$, $0 \leq z49 \leq 100$, $0 \leq z50 \leq 100$, $1 \leq z51 \leq 50$, wherein the siloxane has an average polymerization degree of from 5 to 500, preferably from 7 to 450, and more preferably from 10 to 400.)

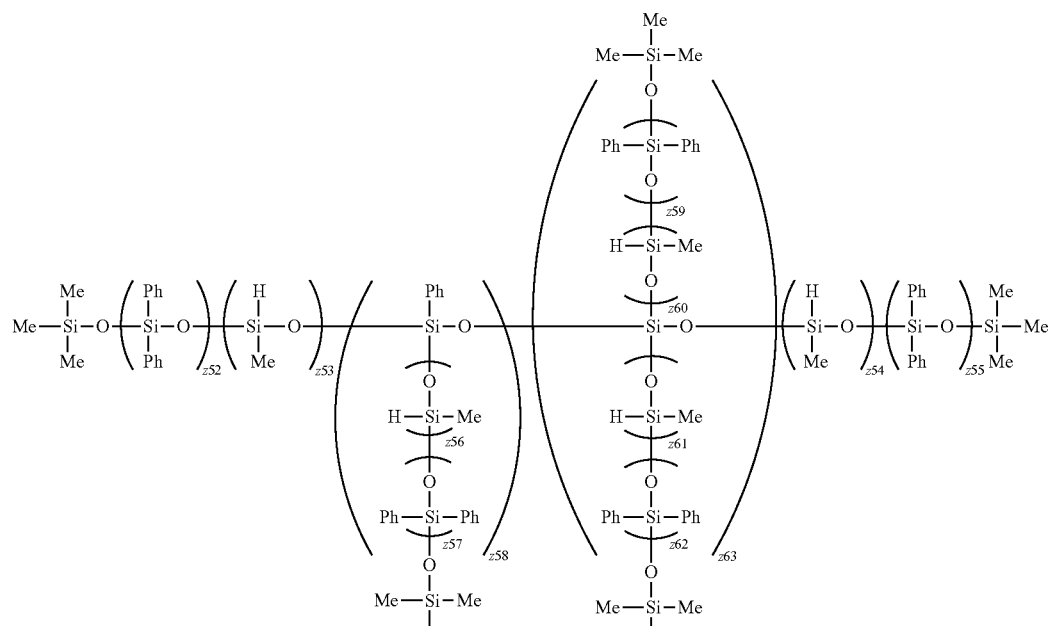

($0 \leq z52 \leq 100$, $0 \leq z53 \leq 100$, $0 \leq z54 \leq 100$, $0 \leq z55 \leq 100$, $0 \leq z56 \leq 100$, $0 \leq z57 \leq 100$, $0 \leq z58 \leq 50$, $0 \leq z59 \leq 100$, $0 \leq z60 \leq 100$, $0 \leq z61 \leq 100$, $0 \leq z62 \leq 100$, $1 \leq z63 \leq 50$, wherein the siloxane has an average polymerization degree of from 5 to 500, preferably from 7 to 450, and more preferably from 10 to 400.)

[Component (E)]

The silicone composition according to the invention may further comprise (E) at least one compound selected from organo(poly)siloxanes having alkenyl groups of at least 4.5% in number, relative to a total number of groups each bonded to a silicon atom, and having no aryl group, and organic compounds, other than organo(poly)siloxanes, having an alkenyl content of from 0.15 to 2.5 mol/100 g. The compound may be used alone, or in combination of two or more of them.

The addition of component (E) to the silicone composition of the invention can further enhance the light peeling property and the curability of the composition. Component (E) has a higher alkenyl content than component (A). Accordingly, its addition in a small amount can decrease the number of residual SiH groups, thereby resulting in a cured product showing light peeling properties. When component (E) has two or more alkenyl groups, the coating formation occurs through the crosslinking reaction more easily, resulting in improved curability.

Examples of the alkenyl group include alkenyl groups, such as vinyl, allyl, hexenyl and octenyl groups; and cycloalkenylalkyl groups, such as cyclohexenylethyl group. Examples of the monovalent hydrocarbon group containing alkenyl group(s) and optionally oxygen atom(s) include acryloylalkyl and methacryloylalkyl groups, such as acryloylpropyl, acryloylmethyl and methacryloylpropyl groups. They may optionally have an ether bond in a methylene chain, e.g., —$(CH_2)_2$—O—$CH_2$—CH=$CH_2$, —$(CH_2)_3$—O—$CH_2$—CH=$CH_2$.

Preferably, component (E) has a viscosity at 25° C. of less than 1 Pa·s, more preferably from 0.1 mPa·s to 0.5 Pa·s, and still more preferably from 0.5 mPa·s to 0.1 Pa·s. If the viscosity exceeds the upper limit indicated above, component (E) may have limited mobility in the composition, so that the alkenyl and SiH groups may remain unreacted.

The component (E) organo(poly)siloxane is preferably represented by the general formula (5) shown below. The organopolysiloxane may be used alone, or in combination of two or more of them. It should be noted that the sequence of the siloxane units in parentheses is for an illustrative purpose only, and is not limited thereto or thereby. As described above, the compound of the formula (5) is a siloxane which is different from component (A) in that the percentage of the number of alkenyl groups relative to the total number of groups each bonded to a silicon atom is at least 4.5%, preferably at least 5.0%.

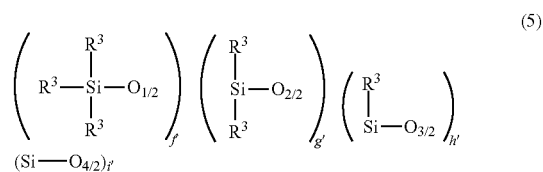

In the formula (5) above, $R^3$ is independently selected at each occurrence from those groups already described above for $R^3$ of component (A). The organopolysiloxane has at least one alkenyl group per molecule. In view of the releasability, the alkyl groups are especially preferred, such as methyl, ethyl and propyl groups.

In the formula (5) above, f' is an integer of at least 2, g' is an integer of at least 0, h' is an integer of at least 0, and i' is an integer of at least 0, and such as to attain the viscosity within the range described above. Preferably, f' is an integer of from 2 to 100, g' is an integer of from 0 to 10,000, h' is an integer of from 0 to 50, and i' is an integer of from 0 to 50, more preferably $2 \leq f'+g'+h'\pm i' \leq 10,000$, and still more preferably $5 \leq f'+g'+h'+i' \leq 5,000$. If the value of f'+g'+h'+i' is less than the lower limit indicated above, the resulting composition may show poor coatability. If the value exceeds the upper limit indicated above, high-speed coating of the composition on a substrate surface may cause misting at a coating roll of a coating apparatus.

Examples of the component (E) organo(poly)siloxane of include, but not limited to, the compounds shown below. In the formulas shown below, Me and Vi stand for a methyl group and a vinyl group, respectively.

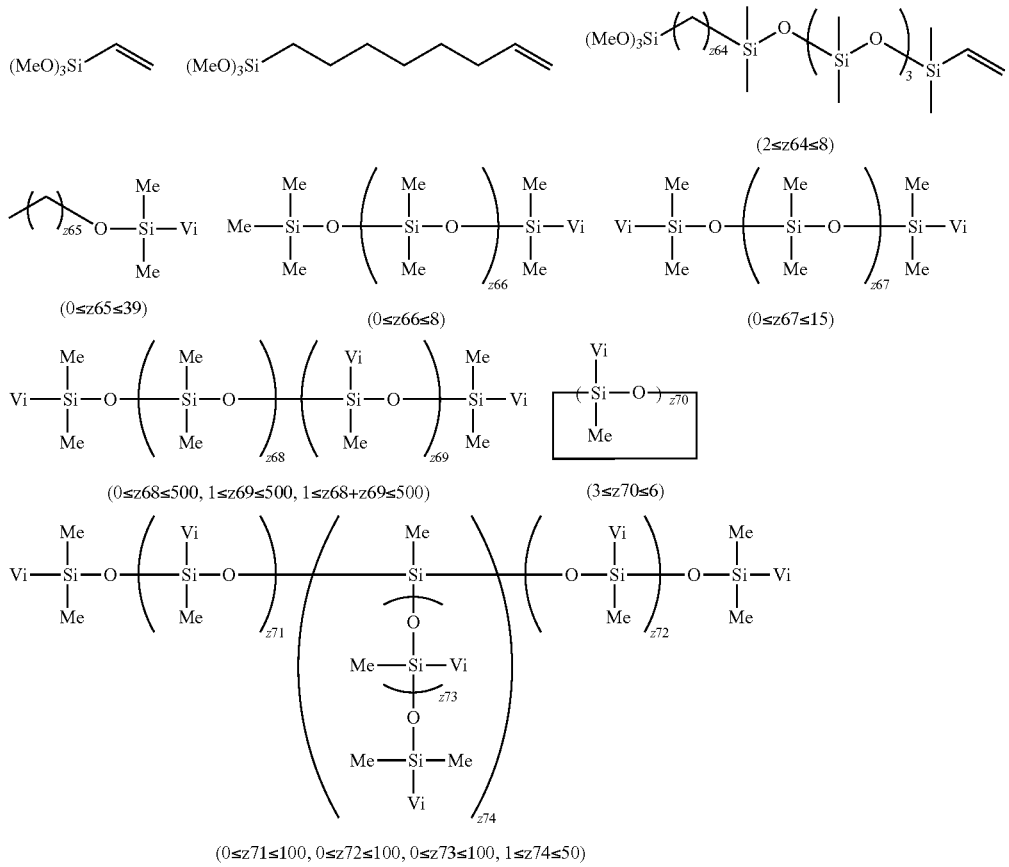

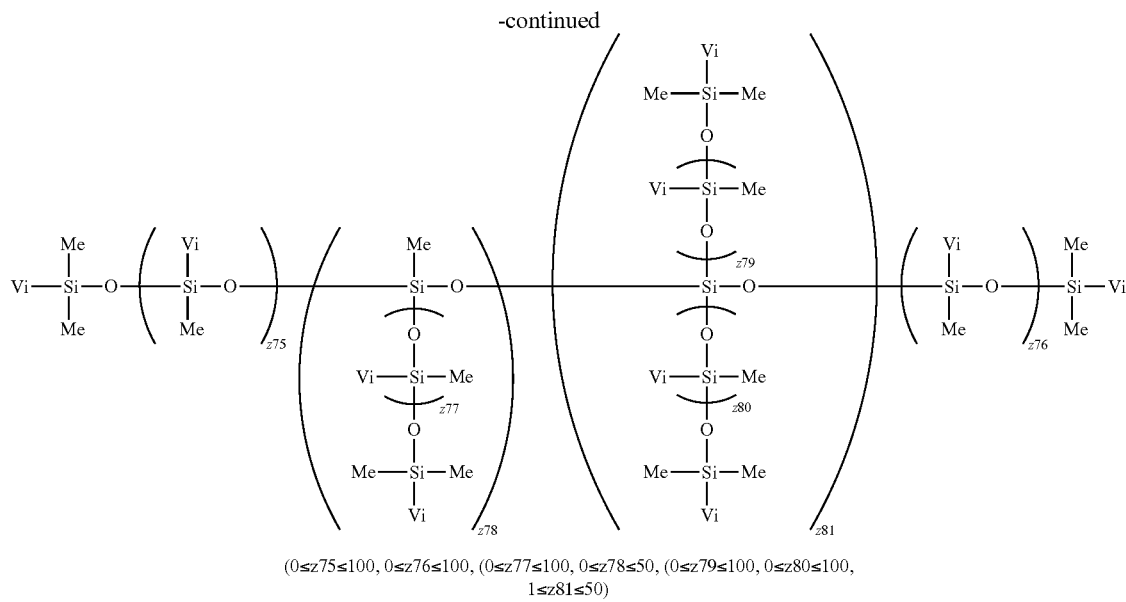

($0 \leq z75 \leq 100$, $0 \leq z76 \leq 100$, ($0 \leq z77 \leq 100$, $0 \leq z78 \leq 50$, ($0 \leq z79 \leq 100$, $0 \leq z80 \leq 100$, $1 \leq z81 \leq 50$)

The composition may further comprise an organic compound, other than organo(poly)siloxanes, having at least one alkenyl group in an alkenyl content of from 0.15 to 2.5 mol/100 g. Preferable organic compounds are hydrocarbon compounds of 5 to 85 carbon atoms, which may have an ether bond, an ester bond, a hydroxy group and an epoxy group, and may have an aromatic group. More preferably, it has an alkenyl content of from 0.18 to 2.3 mol/100 g, still more preferably from 0.20 to 2.0 mol/100 g. The intended effect of an alkenyl group can be attained when the alkenyl content is at least the lower limit indicated above. If the content exceeds the upper limit, heavy peeling may occur.

Examples of the organic compounds other than organo(poly)siloxane include compounds shown below.

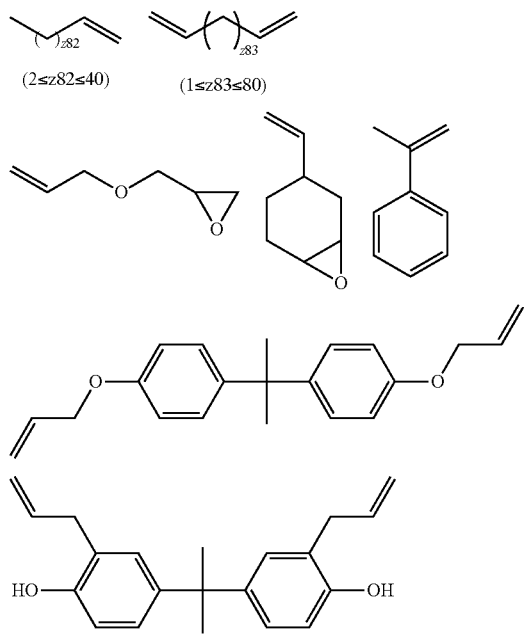

($2 \leq z82 \leq 40$)  ($1 \leq z83 \leq 80$)

The amount of component (E) to be added is preferably from 0.01 to 10 parts by mass, in particular from 0.05 to 9 parts by mass, relative to total 100 parts by mass of components (A) and (B). If the amount exceeds the upper limit indicated above, the curability or adhesion may be worse. If the amount is less than the lower limit indicated above, the intended effect of component (E) may not be attained.

Preferably, the ratio of the total number of the SiH groups in components (B) and (D) to the number of the alkenyl groups in component (A) and, if any, component (E), i.e., [{(SiH groups of component (B))+(SiH groups of component (D))}/{(alkenyl groups of component (A))+(alkenyl groups of component (E))}], is at least 0.8, more preferably from 1.0 to 8.0, and still more preferably from 1.2 to 5.0. If the ratio is less than the lower limit indicated above, the curability or adhesion may be worse.

[Other Optional Components]

The silicone composition according to the invention may be obtained by blending components (A) to (D), and optionally component (E), in the amounts described above. In addition to these components, one or more other components may be added, if necessary, in so far as the benefits of the invention are not impaired. Such other components may be any ingredients conventionally used in silicone compositions for release applications, and those well known in the art may be added in ordinary amounts. For instance, a variety of organonitrogen compounds, organophosphorus compounds, acetylenic compounds, oxime compounds and organochlorine compounds may be used as a pot life extender.

Specific examples include acetlyenic alcohols, such as 3-methyl-1-butyn-3-ol, 3,5-dimethyl-1-hexyn-3-ol, 3-methyl-1-penten-3-ol, phenylbutynol and 1-ethynylcyclohexanol; acetylenic compounds, such as 3-methyl-3-1-penten-1-yne and 3,5-dimethyl-1-hexyn-3-yne; reaction products of these acetylenic compounds with alkoxysilanes or siloxanes or hydrogensilanes; vinylsiloxanes, such as tetramethylvinylsiloxane cyclics; organonitrogen compounds such as benzotriazole; and organophosphorus compounds, oxime compounds and organochlorine compounds. These compounds may be used in any suitable amount for providing a good pot life, preferably from 0.01 to 10 parts by mass, more preferably from 0.05 to 5 parts by mass, relative to total 100 parts by mass of components (A) and (B).

If necessary, other additives known in the art, including antioxidants, light peeling additives, heavy peeling additives, pigments, stabilizers, antistatic agents, antifoaming agents, adhesion promoters, thickeners, solvents, and inorganic fillers such as silica may be further added as long as the benefits of the invention are not impaired.

There is no particular limitation on a method for preparing the silicone composition. Preferably in view of the pot life, components (A), (B), (D), and optionally component (E) and other components are homogeneously mixed in advance, and component (C) is admixed immediately before the use.

The silicone composition according to the invention may be applied on a substrate surface, and cured to form a cured coating on the substrate surface. This imparts releasability to the substrate (i.e., a property for the substrate to be cleanly peeled off from an adhesive material). After a substrate having a release layer of the cured product of the present silicone composition is laminated with an adhesive material, the adhesive material can be peeled off from the release layer without deteriorating the remaining adhesion of the adhesive material. The silicone composition may be applied on the substrate surface in any method known in the art, for example, with a coater, such as comma coater, lip coater, roll coater, die coater, knife coater, blade coater, rod coater, kiss coater, gravure coater, and wire bar coater, or by a coating technique such as screen coating, dip coating and cast coating. The silicone composition may be applied on one or both surfaces of a sheet-like substrate, such as paper or a film, using any of the methods as described above. Typically, the coated amount of the silicone composition may be 0.01 to 100 g/m². Curing may be carried out under conditions known in the art. Typically, the curing condition includes from 1 to 120 seconds at a temperature of from 50 to 200° C. In a case where release layers are formed on both surfaces of the substrate, it is preferable to form a cured coating on one side and then on the other side.

Examples of the substrate include various types of coated paper, such as polyethylene laminated paper, glassine paper, woodfree paper, kraft paper, and clay coated paper; synthetic paper such as Yupo; polyethylene film; polypropylene film, such as CPP and OPP films; polyester film, such as polyethylene terephthalate (PET) film; polyamide film; polyimide film; polylactic acid film; polyphenol film; and polycarbonate film. The substrate may be subjected to a pretreatment, such as corona treatment, etching treatment, or plasma treatment, in order to improve adhesion between the substrate and the cured coating.

EXAMPLES

The invention will be further described with reference to the following Examples and Comparative Examples, which should not to be construed to limit the scope of the present invention. It is noted that "part" is in mass.

Each component used in the Examples and Comparative Examples is shown below. As used hereinafter, a percentage of alkenyl groups (%) refers to a percentage of the number of alkenyl groups (Vi group in the formulas shown below) relative to the total number of groups each bonded to a silicon atom (Vi, Me and Ph groups in the formulas shown below). As used hereinafter, a percentage of aryl groups (%) refers to a percentage of the number of aryl groups (Ph group in the formulas shown below) relative to the total number of hydrogen atoms each bonded to a silicon atoms and groups each bonded to a silicon atom (Vi, Me and Ph groups in the formulas shown below). It should be noted that the sequence of the siloxane units shown in parentheses is for an illustrative purpose only, and is not limited thereto or thereby.

Component (A)

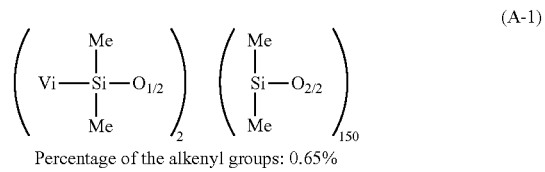

Percentage of the alkenyl groups: 0.65%

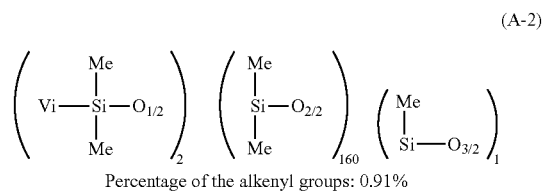

Percentage of the alkenyl groups: 0.91%

Component (B)

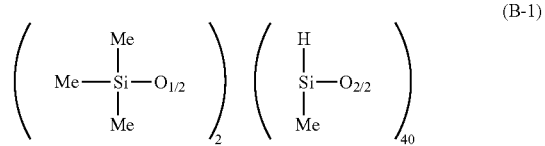

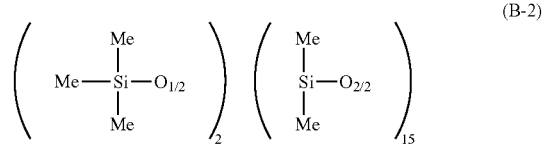

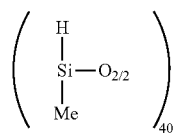

Component (C) Catalyst: platinum-vinyl siloxane complex
Component (D)

(D-1)
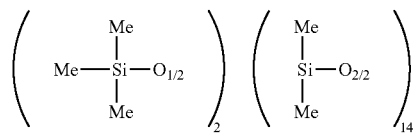

Percentage of the aryl groups: 9.8%

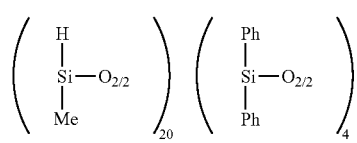
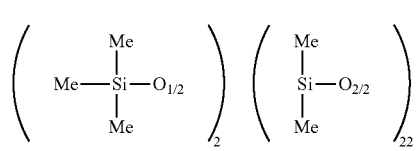

Percentage of the aryl groups: 19.8%

(D-2)
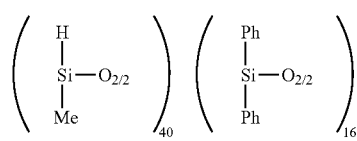
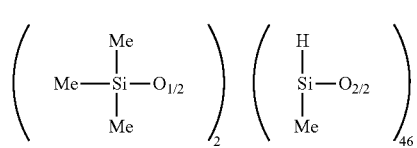

Percentage of the aryl groups: 19.7%

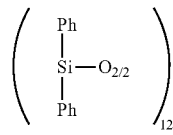

(D-3)
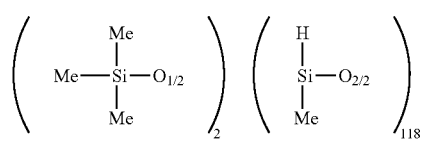

Percentage of the aryl groups: 19.9%

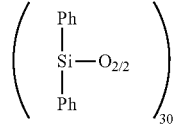

(D-5)
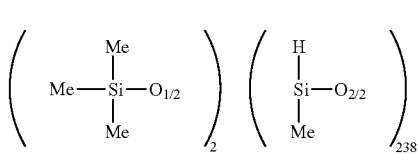

Percentage of the aryl groups: 19.9%

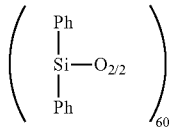

(D-6)
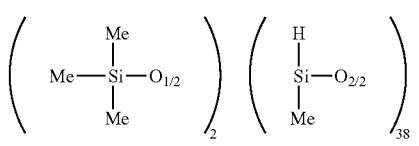

Percentage of the aryl groups: 29.3%

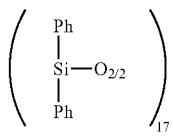

(D-7)
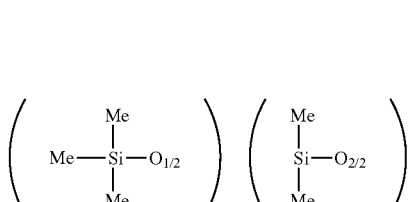

Percentage of the aryl groups: 19.9%

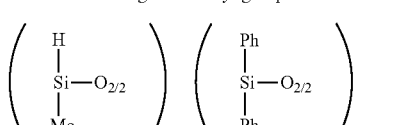

(D2-1)
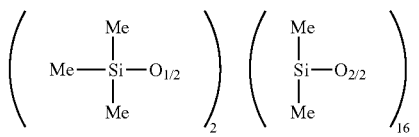

Percentage of the aryl groups: 4.9%

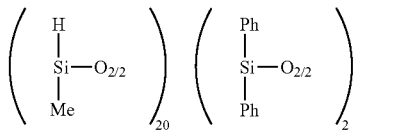

Component (E)
(E-1)
Organopolysiloxane composed of 50 mol % of $(CH_3)_2(CH_2=CH)SiO_{1/2}$ unit and 50 mol % of $(CH_3)SiO_{3/2}$ unit Viscosity at 25° C. of 0.03 Pa·s
Percentage of the alkenyl groups: 25%

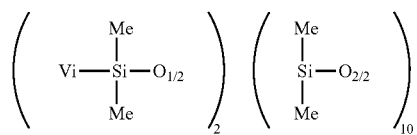

(E-2)

Percentage of alkenyl groups: 7.7%

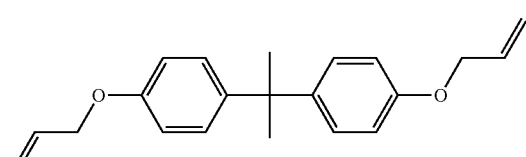

(E-3)

Alkenyl content = 0.65 mol/100 g

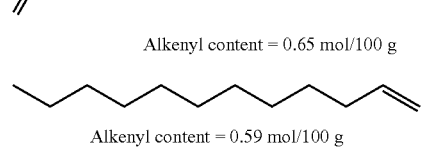

(E-4)

Alkenyl content = 0.59 mol/100 g

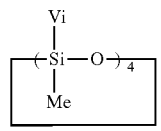

(E-5)

Alkenyl content = 1.16 mol/100 g

[Adhesion Promoter for Comparative Purposes]
(F-1)
Organopolysiloxane of the following formula:

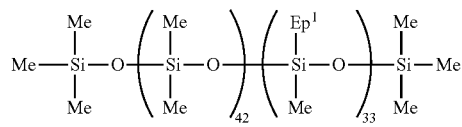

($Ep^1$ is a 2-(3,4-epoxycyclohexyl)ethyl group, Me is a methyl group.)

(F-2)
The adhesion promoter (epoxy group-containing organopolysiloxane) disclosed in JP 2010-500462-A (Patent Literature 5) was synthesized as follows:
43% By mass of an organopolysiloxane with a viscosity at 25° C. of 20 mm²/s, composed of 20 mol % of silanol-terminated siloxane units $(CH_3)_2(OH)SiO_{1/2}$, 40 mol % of methylvinylsiloxane units $(CH_3)(CH_2=CH)SiO_{2/2}$ and 40 mol % of dimethylsiloxane units $(CH_3)_2SiO_{2/2}$ was reacted with 57% by mass of 2-(3,4-epoxycyclohexyl)ethyltrimethoxysilane in the presence of potassium silanolate at 100° C. for 1 hour to obtain an epoxy-containing organopolysiloxane.
The organopolysiloxane had a viscosity of 0.6 Pa·s at 25° C. and had an alkenyl content of 0.20 mol/100 g.
(F-3) Epoxy Group-Containing Siloxane Oligomer
An epoxy group-containing siloxane oligomer was obtained by partial hydrolytic condensation of 99.98% by mass of 3-glycidoxypropyltriethoxysilane with 0.02% by mass of water in the presence of hydrochloric acid at 100° C. for 5 hours.
The siloxane oligomer had a viscosity of 0.01 Pa·s at 25° C.

(G) Pot Life Extender: 1-ethynylcyclohexanol

Examples 1 to 13 and Comparative Examples 1 to 10

Components (A), (B) and (D) to (F) shown above were put in the parts shown in Tables 1 and 2 into a flask, and then 0.3 part of component (G) was added and stirred to dissolve. To the resulting mixture was added component (C) in an amount of 100 ppm by mass of platinum relative to the total mass of components (A) and (B), and mixed under stirring to obtain a silicone composition. This silicone composition was used for the preparation of a coated article (release film) and evaluation thereof in the procedures described below.
<Evaluation>
[Peeling Force]
The composition thus obtained was applied on a PET film having a thickness of 38 μm in an amount of solids of 0.6 g/m² by means of a bar coater, and cured by heating in a hot air dryer at 120° C. for 40 seconds to form a release layer. The release layer was evaluated according to the FINAT method in the following procedures.
An adhesive tape of 25 mm width (Tesa 7475 tape, commercially available from Tesa Tape Inc.) was applied on the surface of the release layer, and subjected to a heat treatment under a load of 20 g/cm² in a dryer at 70° C. for 20 hours. After air-cooled for 30 minutes, the Tesa 7475 tape was pulled by a tensile tester at an angle of 180° and a peeling speed of 0.3 m/min to determine a force (in gf/25 mm) required for peeling it. The results are shown in Tables 1 and 2.
[Remaining Adhesion]
The Tesa 7475 tape which had been subjected to the peeling test described above was applied on an SUS stainless steel plate, and pressed with a 2-kg tape roller in one cycle of moving back and forth. The tape was peeled off with a tensile tester at an angle of 180° and at a speed of 0.3 m/min to determine a force F (in N/25 mm) required for peeling it. For comparison, an unused Tesa 7475 tape was applied on an SUS plate and a force $F_0$ (in N/25 mm) required for peeling it was determined in the same manner. Remaining adhesion (%), i.e., percentage of the adhesion remaining in the Tesa 7475 tape after the removal from the release layer, relative to the adhesion of the unused Tesa 7475 tape, was calculated by the equation: $F/F_0 \times 100$. The results are shown in Tables 1 and 2.
[Adhesion after Aging at Room Temperature]
A release layer was formed on a PET film having a thickness of 38 μm in the same manner as described above, and stored at 25° C. and 50% RH. After storing for a period of 1 day, 5 days and 30 days, the release layer was rubbed with a finger in ten strokes to see by visual inspection if the release layer was rubbed off or not, and evaluated on the following criteria. The results are shown in Tables 1 and 2.
  A: no rub-off occurred after 30 days
  B: no rub-off occurred after 1 day, but rub-off occurred after 5 days
  C: rub-off occurred after 1 day.
[Transparency of the Coating]
A release layer was formed on a PET film having a thickness of 38 μm in the same manner as described above, and haze (%) of the coating of a 0.6 μm thickness was determined with a haze meter (NDH5000SP, ex Nippon Denshoku Industries Co., Ltd.) according to JIS K 7136 (Determination of haze for plastic-transparent materials). The results are shown in Tables 1 and 2.

Haze is defined as a ratio of a diffuse transmittance to a total light transmittance. A lower haze (%) indicates a higher level of transparency.

100 ppm by mass of platinum relative to the total mass of components (A) and (B), and mixed under stirring to obtain a silicone composition. This silicone composition was used

TABLE 1

| (parts by mass) | | Examples |||||||||||||
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Component (A) | (A-1) | 97.8 | 97.8 | 97.8 | 97.8 | 97.8 | 97.8 | 97.8 | 97.8 | 97.8 | 97.8 | 97.8 | 97.8 | 97.8 |
| | (A-2) | | | | | | | | | | | | | |
| Component (B) | (B-1) | 2.2 | 2.2 | 2.2 | 2.2 | 2.2 | 2.2 | 2.2 | 2.2 | 2.2 | 2.2 | 2.2 | 2.2 | 2.2 |
| Component (D) | (D-1) | | | | | | | | | | | | 5.0 | 5.0 |
| | (D-2) | 2.0 | | | | | | | | | | | | |
| | (D-3) | | 2.0 | | | | | | | | | | | |
| | (D-4) | | | 2.0 | | | | | 2.0 | 2.0 | 2.0 | 2.0 | 2.0 | |
| | (D-5) | | | | 2.0 | | | | | | | | | |
| | (D-6) | | | | | 2.0 | | | | | | | | |
| | (D-7) | | | | | | 2.0 | | | | | | | |
| Component (E) | (E-1) | | | | | | | 1.6 | | | | | | 2.8 |
| | (E-2) | | | | | | | | 4.0 | | | | | |
| | (E-3) | | | | | | | | | 1.4 | | | | |
| | (E-4) | | | | | | | | | | 1.5 | | | |
| | (E-5) | | | | | | | | | | | 0.8 | | |
| H/Vi ratio in number [(B) + (D)]/[(A) + (E) + (F)] | | 2.6 | 3.0 | 3.0 | 3.0 | 2.8 | 2.5 | 2.0 | 2.0 | 2.0 | 2.0 | 2.0 | 3.8 | 2.0 |
| H/Vi ratio in number [(B)]/[(A)] | | 2.0 | 2.0 | 2.0 | 2.0 | 2.0 | 2.0 | 2.0 | 2.0 | 2.0 | 2.0 | 2.0 | 2.0 | 2.0 |
| H/Vi ratio in number [(D)]/[(A)] | | 0.6 | 1.0 | 1.0 | 1.0 | 0.8 | 0.5 | 1.0 | 1.0 | 1.0 | 1.0 | 1.0 | 1.8 | 1.8 |
| Peeling force [gf/25 mm] | | 19.2 | 18.8 | 17.4 | 16.5 | 19.3 | 18.4 | 11.9 | 12.1 | 14.4 | 15.6 | 13.5 | 39.2 | 21.6 |
| Remaining adhesion [%] | | 95 | 98 | 96 | 94 | 93 | 95 | 100 | 100 | 98 | 96 | 98 | 100 | 100 |
| Adhesion after aging at room temperature | | A | A | A | A | A | B | A | A | A | A | A | A | A |
| Haze [%] | | 2.72 | 2.68 | 2.66 | 2.75 | 2.70 | 2.91 | 2.70 | 2.67 | 2.75 | 2.69 | 2.68 | 2.66 | 2.61 |

TABLE 2

| (parts by mass) | | Comparative Examples ||||||||||
|---|---|---|---|---|---|---|---|---|---|---|---|
| | | 1 | 2 | 3 | 4 | 5 | 6 | 7 | 8 | 9 | 10 |
| Component (A) | (A-1) | 97.8 | 97.8 | 100 | 97.8 | 97.8 | 48.7 | 97.8 | 97.8 | 97.8 | |
| | (A-2) | | | | | | 48.7 | | | | 97.8 |
| Component (B) | (B-1) | 2.2 | 2.2 | | 2.2 | 2.2 | 2.6 | 2.2 | 2.2 | 2.2 | 2.2 |
| Component (D) | (D-2) | | | | | | | | | | 11.1 |
| | (D-3) | | | 11.5 | | | | | | | |
| | (D-4) | | 15.0 | | | | | | | | |
| Comparative component | (D2-1) | | | | 2.0 | 5.0 | | | | | |
| Comparative component | (F-1) | | | | | | | 1.5 | | | |
| | (F-2) | | | | | | | | 1.5 | | |
| | (F-3) | | | | | | | | | 1.5 | |
| H/Vi ratio in number [(B) + (D)]/[(A) + (E) + (F)] | | 2.0 | 9.7 | 5.6 | 2.8 | 4.0 | 2.0 | 2.0 | 1.7 | 2.0 | 3.9 |
| H/Vi ratio in number [(B)]/[(A)] | | 2.0 | 2.0 | 0 | 2.0 | 2.0 | 2.0 | 2.0 | 2.0 | 2.0 | 1.4 |
| H/Vi ratio in number [(D)]/[(A)] | | 0 | 7.7 | 5.6 | 0.8 | 2.0 | 0 | 0 | 0 | 0 | 2.5 |
| Peeling force [gf/25 mm] | | 11.5 | 47.7 | 23.5 | 23.8 | 50.1 | 12.1 | 18.1 | 11.1 | 12.0 | 45.0 |
| Remaining adhesion [%] | | 100 | 95 | 94 | 98 | 94 | 98 | 96 | 91 | 95 | 99 |
| Adhesion after aging at room temperature | | C | A | A | C | C | C | C | C | C | A |
| Haze [%] | | 2.66 | 3.75 | 3.88 | 2.65 | 2.68 | 2.70 | 2.71 | 2.70 | 2.69 | 3.74 |

Examples 14-16, Comparative Examples 11 and 12

Components (A), (B), (D) and (E) shown above were put in parts shown in Table 3 into a flask, and then 0.3 part of component (G) was added and stirred to dissolve. To the resulting mixture was added component (C) in an amount of for the preparation of a coated article (release film) and evaluation thereof by the procedures described below.

<Evaluation>
[Peeling Force]

The composition thus obtained was applied on a polyethylene laminate paper in an amount of 1.0 g/m², and cured by heating in a hot air dryer at 100° C. for 20 seconds to form a release layer. The release layer was evaluated according to the FINAT method in the following procedures.

An adhesive tape of 25 mm width (Tesa 7475 tape, commercially available from Tesa Tape Inc.) was applied on the surface of the release layer, and subjected to a heat treatment under a load of 20 g/cm$^2$ in a dryer at 70° C. for 20 hours. After air-cooled for 30 minutes, the Tesa 7475 tape was pulled by a tensile tester at an angle of 180° and a peeling speed of 0.3 m/min to determine a force (in gf/25 mm) required for peeling it. The results are shown in Table 3.

[Remaining Adhesion]

The Tesa 7475 tape which had been subjected to the peeling test described above was applied to an SUS stainless steel plate, and pressed with a 2-kg tape roller in one cycle of moving back and forth. The tape was peeled off with a tensile tester at an angle of 180° and at a speed of 0.3 m/min to determine a force F (in N/25 mm) required for peeling it. For comparison, an unused Tesa 7475 tape was applied to an SUS plate and a force $F_0$ (in N/25 mm) required for peeling it was determined in the same manner. Remaining adhesion (%), i.e., percentage of the adhesion remained in the Tesa 7475 tape after the removal from the release layer, relative to the adhesion of the unused Tesa 7475 tape, was calculated by the equation: $F/F_0 \times 100$. The results are shown in Table 3.

[Adhesion after Aging at High Temperature and a High Humidity]

A release layer was formed on a polyethylene laminate paper in the same manner as described above, and stored at 60° C. and 90% RH. After storing for a period of 1 day, 3 days and 5 days, the release layer was rubbed with a finger in ten strokes to see by visual inspection if the release layer was rubbed off or not, and evaluated on the following criteria. The results are shown in Table 3.

A: no rub-off occurred after 5 days
B: no rub-off occurred after 1 day, but rub-off occurred after 3 days
C: rub-off occurred after 1 day.

TABLE 3

| | | Examples | | | Comparative Examples | |
|---|---|---|---|---|---|---|
| | | 14 | 15 | 16 | 11 | 12 |
| Component (A) | (A-1) | 98.0 | 98.0 | 98.0 | 98.0 | 98.0 |
| Component (B) | (B-1) | 0.8 | 0.8 | 0.8 | 0.8 | 0.8 |
| | (B-2) | 1.2 | 1.2 | 1.2 | 1.2 | 1.2 |
| Component (D) | (D-4) | 2.0 | | 2.0 | | |
| | (D-6) | | 2.0 | | | |
| Comparative Component | (D2-1) | | | | | 5.0 |
| Component (E) | (E-1) | | | | 1.2 | |
| H/Vi ratio in number [(B) + (D)]/[(A) + (E) + (F)] | | 2.5 | 2.2 | 1.8 | 1.5 | 3.5 |
| H/Vi ratio in number [(B)]/[(A)] | | 1.5 | 1.5 | 1.5 | 1.5 | 2.0 |
| H/Vi ratio in number [(D)]/[(A)] | | 1.0 | 0.7 | 1.0 | 0 | 1.5 |
| Peeling force [gf/25 mm] | | 14.3 | 15.8 | 12.0 | 9.9 | 43.0 |
| Remaining adhesion [%] | | 97 | 98 | 100 | 100 | 97 |
| Adhesion after aging at high temperature and a high humidity | | A | A | A | C | C |

As shown in Table 2, the coatings obtained from the silicone compositions of Comparative Examples 2, 3 and 10, which contained a larger amount of the organohydrogenpolysiloxane having aryl groups, had the higher haze and therefore had poor transparency. The cured coating obtained from the silicone compositions of Comparative Examples 4 and 5, which contained the organohydrogenpolysiloxane having an aryl percentage outside the range of the present invention, showed poor adhesion to the plastic substrate at room temperature. In addition, the silicone compositions of Comparative Examples 1 and 6, which did not contain component (D), and the silicone compositions of Comparative Examples 7 to 9, which contained a conventional adhesion promoter in place of component (D), also showed poor adhesion to the plastic substrate at room temperature. As shown in Table 3, the coatings obtained from the silicone compositions, which contained no component (D) or had a lower aryl content, also showed poor adhesion to the polyethylene laminate paper at a high temperature and a high humidity. In contrast, as shown in Table 1, the cured coatings obtained from the silicone compositions of the present invention had the high transparency and the excellent adhesion to the plastic film substrate. These cured coatings also allowed the adhesive material to be peeled off by a small force from the release layer of the cured coating, while retaining high adhesion of the adhesive material after removed.

As shown in Table 3, the silicone compositions of the present invention formed the coatings on the polylaminate paper substrate, with the light peeling (i.e., requiring a small force for peeling), and the excellent adhesion even after storage at a high temperature and a high humidity.

INDUSTRIAL APPLICABILITY

According to the present invention, the silicone composition serves suitably as a solvent-free-type releasing agent and provides a cured coating with high transparency. The silicone composition may be used to form a cured coating on a surface of a substrate such as a paper or plastic substrate, with good adhesion to the substrate, to give release paper and release film.

The invention claimed is:

1. A silicone composition comprising:
    (A) an organopolysiloxane having at least two alkenyl groups each bonded to a silicon atom in a molecule, and having no aryl group, wherein a percentage of the number of the alkenyl groups relative to the number of groups each bonded to a silicon atom is from 0.01% to less than 4.5%;
    (B) an organohydrogenpolysiloxane having at least three hydrogen atoms each bonded to a silicon atom in a molecule, and having no aryl group, wherein a ratio of the number of the SiH groups in component (B) to the number of the alkenyl groups in component (A) is 0.5 to 10;
    (C) a catalytic amount of a catalyst based on a platinum group metal; and
    (D) an organohydrogenpolysiloxane having at least three hydrogen atoms each bonded to a silicon atom in a molecule, and having a monovalent aryl group bonded to a silicon atom such that a percentage of the number of the monovalent aryl groups relative to a total number of hydrogen atoms and groups each bonded to a silicon atom is 8% to 50%, the amount of the organohydrogenpolysiloxane (D) being from 0.01 to 10 parts by mass, relative to 100 parts by mass of a total of components (A) and (B),
    wherein a ratio of the number of the SiH groups in component (D) to the number of the alkenyl groups in component (A) is 0.1 to 2.0.

2. The silicone composition according to claim 1, wherein a ratio of the number of the SiH groups in component (D) to the number of alkenyl groups in component (A) is from 0.1 to less than 1.5.

3. The silicone composition according to claim 1, wherein component (D) has the following average compositional formula:

wherein $R^1$ is, independently at each occurrence, a hydroxy group or a substituted or unsubstituted monovalent hydrocarbon group having no aliphatic unsaturated bond, wherein from 8 to 50% of number of $R^1$ relative to a total number of $R^1$ and the hydrogen atoms each bonded to a silicon atom is a monovalent aryl group, a and b are numbers greater than 0, provided that a+b≤3.

4. The silicone composition according to claim 1, wherein component (D) has an average polymerization degree of from 5 to 500.

5. The silicone composition according to claim 3, wherein component (D) is of the following formula (2):

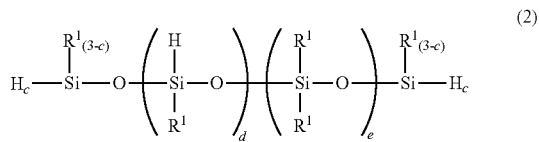

wherein $R^1$ is as defined above, c is 0 or 1, and d and e are integers satisfying the equations, 1≤d≤400 and 0≤e≤400, provided that 3≤2c+d≤400 and 5≤d+e≤498.

6. The silicone composition according to claim 1, further comprising:

(E) at least one compound selected from organo(poly)siloxanes having alkenyl groups of at least 4.5% in number, relative to the total number of groups each bonded to a silicon atom, and having no aryl group, and organic compounds, other than organo(poly)siloxanes, having an alkenyl content of from 0.15 to 2.5 mol/100 g, an amount of component (E) being from 0.01 to 10 parts by mass, relative to total 100 parts by mass of components (A) and (B).

7. The silicone composition according to claim 1, wherein a ratio of a total number of the SiH groups in components (B) and (D) to the number of the alkenyl groups in component (A) or a total number of the alkenyl groups in components (A) and, if any, (E), is from 0.8 to 10.

8. The silicone composition according to claim 1, which is free of a solvent.

9. A release film comprising a film substrate and a layer of a cured product of the silicone composition according to claim 1 on at least one surface of the film substrate.

10. Release paper comprising a paper substrate and a layer of a cured product of the silicone composition according to claim 1 on at least one surface of the paper substrate.

11. The silicone composition according to claim 1, wherein the monovalent aryl group is a phenyl group.

* * * * *